2,722,531
SUBSTITUTED OXAZOLIDINES AND PROCESS FOR PREPARING THE SAME

Rudi Rätz, Columbus, Ohio, assignor to Bohme Fettchemie G. m. b. H., Dusseldorf, Germany No Drawing. Application June 24, 1953,
Serial No. 363,930

Claims priority, application Germany August 13, 1952

8 Claims. (Cl. 260—307)

The present invention relates to novel oxazolidines which are substituted by organic sulfo acid radicals linked to N; the invention likewise relates to a process for preparing said novel compounds.

The compounds according to the present invention may be prepared by reacting N-(beta-oxyalkyl) sulfonamides with oxo compounds or with compounds capable of giving off oxo compounds, in the presence of gaseous halogen halides. The compounds thus obtained correspond to the general formula

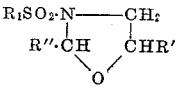

in which R stands for an alkyl, aryl, aralkyl or cycloalkyl radical and R' or R'' for hydrogen or a hydrocarbon radical. If R, R' or R'' stand for a hydrocarbon radical, they may be interrupted by hetero atoms or hetero atom groups; or they may have substituents in the hydrocarbon chain.

The reaction may be carried out at temperatures below 100° C., preferably at room temperature, and is advantageously allowed to proceed in an indifferent solvent free from water, e. g. benzene, toluene, tetrahydro naphthalene, decahydro naphthalene, chlorinated hydrocarbons, or the like. Apparently, a chloromethyl ether is first formed as an intermediate, which immediately continues to react with ring formation thus forming the oxazolidine.

As starting materials for the process according to the present invention I may use for instance the following oxyalkylated sulfonamides: N-(β-oxyethyl)-butanesulfonamide, N-(β-oxyethyl)-dodecane sulfonamide, N-(β-oxyethyl)-4-toluene sulfonamide, N-(β-oxyethyl)-4-alkylbenzene sulfonamide, N-(β-oxyethyl)-4-nitrobenzene sulfonamide, N,N'-di(β-oxyethyl)-1,3-benzenedisulfamide, N-(β-γ-dioxypropyl)-dodecyl benzene sulfonamide etc.

As oxo compounds or substances giving off oxo compounds I may use primarily formaldehyde, paraformaldehyde, trioxymethylene, hexamethylenetetramine, and the like. Other compounds to be used are: acetaldehyde, benzaldehyde, acetone, acetophenone, cyclohexanone etc. As hydrogen halide I use primarily hydrogen chloride, but other hydrogen halides may likewise be used.

The novel substituted oxazolidines according to the present invention are compounds difficultly soluble in water, but which are readily soluble in organic solvents. In acid solution, they are decomposed with re-formation of the N-(β-oxyalkyl) sulfonamides and the oxo compounds used in their preparation; in alkaline solutions they are stable.

The novel compounds may be used as intermediates in the preparation of pesticides, textile finishing agents, and pharmaceuticals. They exhibit disinfectant properties; when they contain higher molecular hydrocarbons, they have the properties of softeners for plastics.

While it was known that N-alkylated and N-arylated oxazolidines may be obtained by ring formation when reacting N-alkylated or N-arylated oxyethyl amines with formaldehyde in alkaline aqueous solutions, the reaction cannot be carried out with N-(β-oxyalkyl) sulfonamides. It was therefore unexpected that the reaction could be carried out under the conditions applied according to the present invention.

The invention will now be described more fully in a number of examples, but it should be understood that these are given by way of illustration and not of limitation and that many variations in the starting materials and the quantities reacted may be made without departing from the spirit of the invention.

Example 1

21.5 grams N-(β-oxyethyl)-4-toluene sulfonamide (1/10 mol) and 3.3 grams paraformaldehyde are suspended in 250 cc. dry benzene, and dry hydrogenchloride is introduced into the suspension while stirring. The reactants are dissolved and water is formed as a separate layer. This aqueous layer is separated from the benzene layer and the dissolved hydrogenchloride driven off by the introduction of a dry air current. The solvent is dried with calciumchloride and thereafter distilled in vacuo, leaving an oily residue which, after a while, solidifies in crystalline form. N-(4-toluene sulfonyl)-oxazolidine is obtained in almost quantitive amount. The compound can be dissolved in water and re-crystallized therefrom; it has then a melting point of 105–106° C.

Example 2

47 grams N-(β-oxyethyl)-4-chlorobenzene sulfonamide (1/5 mol) and 6.6 g. paraformaldehyde are reacted in 200 cc. dry benzene with introduction of gaseous hydrogen chloride as described in Example 1. After distilling off the benzene, an oil is obtained which is washed in water until the reaction is neutral and is then dried in vacuo, whereupon it solidifies in crystalline form. After recrystallization in water I obtain N-(4-chlorobenzenesulfonyl)-oxazolidine in colorless fine needles of a melting point of 83 to 84° C.

Example 3

12.8 grams N-(β-oxyethyl)-dodecane sulfonamide (M. P. 63–64° C.) are dissolved in 100 cc. dry benzene. After addition of 1.44 g. paraformaldehyde, hydrogen chloride is introduced into the solution while stirring. When the reaction is completed, water is separated as described in Example 1. Benzene is distilled off and the oil thereby obtained thoroughly washed with water until the reaction is neutral. Drying occurs in vacuo at 50° C. and the slightly yellow oil obtained thereby is converted into a semi-solid pasty mass by allowing to stand for several days, and N-(dodecanesulfonyl)-oxazolidine is obtained in almost quantitive amount.

Example 4

In a similar manner as described above, N-(dodecanesulfonyl)-5-oxymethyl-oxazolidine is obtained in the form of an almost colorless semi-solid mass from 6.46 g. N-(β-γ-dioxypropyl)-dodecane sulfonamide (M. P. 109–110° C.) and 0.66 g. paraformaldehyde.

Example 5

24.6 g. N-(β-oxyethyl)-4-nitrobenzene sulfonamide (1/10 mol), (M. P. 126.5–127.5° C.), 3.3 g. paraformaldehyde and gaseous hydrogen chloride in benzene solution are converted into N-(4-nitrobenzene-sulfonyl)-oxazolidine in about 80% yield. The clear yellow oil obtained after distilling off the benzene is washed with water until neutral and gradually takes on solid form. After having been dried in vacuo, it can be ground to a fine powder which is recrystallized from a mixture of water and acetone. The thus obtained N-(4-nitrobenzenesulfonyl)-oxazolidine is light yellow and melts at about 110° C. after previous sintering.

*Example 6*

176.5 g. (=½ mol) of a N-(β-oxyethyl)-alkylbenzene sulfonamide obtained from alkylbenzene sulfochloride mixture (mean alkyl chain length $C_{13}$) and mono-ethanolamine are reacted with 16.5 g. paraformaldehyde in 400 cc. benzene while gaseous hydrogen chloride is introduced. The viscous reaction product remaining after benzene has been distilled in vacuo, is washed to neutral reaction with 10% common salt solution. The product is dissolved in ether and dried with sodiumsulfate. After filtration and removal of the solvent, N-(alkylbenzenesulfonyl)oxazolidine is obtained in form of a clear brown syrup.

What I claim is:

1. A substituted oxazolidine having the formula

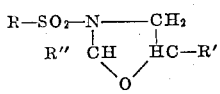

wherein R represents a radical selected from the group consisting of alkyl having up to 12 carbon atoms, phenyl, chlorophenyl, nitrophenyl and alkylphenyl radicals having up to 13 carbon atoms in the alkyl group, and wherein R' and R'' each represents a radical selected from the group consisting of hydrogen and lower alkyl radicals.

2. As a novel compound a substituted oxazolidine of the formula N-(4-toluene sulfonyl)-oxazolidine.

3. As a novel compound a substituted oxazolidine of the formula N-(4-chlorobenzene sulfonyl)-oxazolidine.

4. As a novel compound a substituted oxazolidine of the formula N-(dodecane sulfonyl)-oxazolidine.

5. As a novel compound a substituted oxazolidine of the formula N-(dodecane sulfonyl)-5-oxymethyl-oxazolidine.

6. As a novel compound a substituted oxazolidine of the formula N-(4-nitrobenzene sulfonyl)-oxazolidine.

7. As a novel compound a substituted oxazolidine of the formula N-(alkylbenzene sulfonyl)-oxazolidine, having a mean alkyl chain length of $C_{13}$.

8. The process for preparing a substituted oxazolidine having the formula

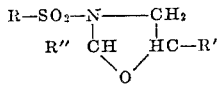

which comprises reacting an N-(β-oxyalkyl)-sulfonamide having the configuration

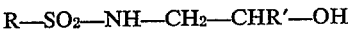

with an aldehyde having the configuration R''CHO in the presence of a hydrogen halide, wherein R represents a radical selected from the group consisting of alkyl having up to 12 carbon atoms, phenyl, chlorophenyl, nitrophenyl and alkylphenyl radicals having up to 13 carbon atoms in the alkyl group, and wherein R' and R'' each represents a radical selected from the group consisting of hydrogen and lower alkyl radicals.

References Cited in the file of this patent

Bergmann: Chem. Reviews, vol. 53, pp. 310–14 (1953).

Read et al.: J. Chem. Soc., vol. 1929, pp. 2305–6.